(12) United States Patent
Ledingham

(10) Patent No.: US 6,786,672 B2
(45) Date of Patent: *Sep. 7, 2004

(54) LOW PROFILE ROD CLAMP

(75) Inventor: Stuart J. Ledingham, Coto de Caza, CA (US)

(73) Assignee: Solus Industrial Innovations LLC, Rancho Santa Margarita, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 10/460,906

(22) Filed: Jun. 13, 2003

(65) Prior Publication Data

US 2003/0205447 A1 Nov. 6, 2003

Related U.S. Application Data

(63) Continuation of application No. 09/628,869, filed on Jul. 26, 2000, now Pat. No. 6,579,032.

(51) Int. Cl.⁷ ................................................. B25G 3/36
(52) U.S. Cl. ....................... 403/400; 403/394; 403/396; 198/836.3
(58) Field of Search ........................... 198/836.1, 836.2, 198/836.3, 836.4; 403/400, 393, 396, 399, 394, 395

(56) References Cited

U.S. PATENT DOCUMENTS

| | | | | |
|---|---|---|---|---|
| 5,626,221 A | * | 5/1997 | Ledingham | 198/836.3 |
| 5,782,339 A | * | 7/1998 | Drewitz | 198/836.3 |
| 5,860,511 A | * | 1/1999 | Ensch et al. | 198/836.3 |
| 6,189,685 B1 | * | 2/2001 | Ledingham et al. | 198/836.3 |
| 6,427,829 B1 | * | 8/2002 | Ledingham | 198/836.3 |

FOREIGN PATENT DOCUMENTS

| | | |
|---|---|---|
| FR | 838218 | 3/1939 |
| FR | 965188 | 9/1950 |
| GB | 927624 | 5/1963 |

* cited by examiner

Primary Examiner—Benjamin A. Pezzlo
(74) Attorney, Agent, or Firm—Knobbe, Martens, Olson & Bear LLP

(57) ABSTRACT

A low profile rod clamp comprises two halves having semi-circular channels for receiving a support rod. When the two halves of the clamp are fastened together, the outer surfaces of the rods are in contact. The positioning of the two rods adjacent one another and with surface-to-surface contact results in increased friction and the highest possible load resistance. The clamp provides the ability to raise or lower the support rods in a vertical direction, while also allowing for rotation and the ability to move the rods in a horizontal direction as well.

9 Claims, 5 Drawing Sheets

LOW PROFILE ROD CLAMP

RELATED APPLICATIONS

This is a continuation of U.S. patent application Ser. No. 09/628,869 filed on Jul. 26, 2000 now U.S. Pat. No. 6,579,032, the entire contents of the above related application is incorporated herein by reference and made part of the present specification.

BACKGROUND OF THE INVENTION

1. Field of the Invention

The present invention relates generally to support assemblies used in assembly line and conveyor systems, and more particularly, to a low profile clamp for holding support rods, sensor mounts, and the like.

2. Description of the Related Art

Manufacturers commonly use conveyor systems in processing, packaging and assembly lines to move a product along the line. The product travels on a belt or track, and guide rails are provided to maintain the desired direction of travel, to maintain specific positioning of the product, and to prevent lateral movement of the product off the belt or track.

Rail guide support assemblies are commonly used on each side of the conveyor belt to align one or more guide rails along the path of the conveyor belt. Usually, pairs of support assemblies are positioned across from each other along the conveyor belt structure. Typically, brackets are attached to the sides of the conveyor belt structure, and support rods are mounted to the brackets. Clamps or clips are secured to the support rods to position and support the guide rails.

Conditions exist in the industry where the ability to position or connect two rods, most often in a perpendicular arrangement, is desired. One rod is fastened or connected to a frame or base structure, while the other is used to position a guide rail or other device. Adjustments are often required, however, most devices are limited in the ability to be raised or lowered in a vertical direction, while also allowing for rotation or movement in a horizontal direction.

Commonly used rod clamps are formed of an injection molded solid plastic block, with two loose fitting holes arranged in a perpendicular configuration. There is a split in each hole, which allows the clamp to be compressed around the rods, with leverage by a nut and bolt creating an interference between the inner diameter of the block and the outer diameter of the rod. One problem with this arrangement is that the plastic does not spring back to its original shape once the bolt tension is removed. In addition, although reasonable clamping is achieved, plastic on steel rods cannot provide sufficient friction for many applications. One other disadvantage is the offset of rod centerlines. The larger the offset, the smaller the load required to overcome the friction of the clamp.

Other existing rod clamps, formed of metal or plastic, use a three point contact system. An eyelet and knob provide tension and resistance to sliding or rotation. Because of the eyelets, the rods cannot be positioned with surface-to-surface contact. Because the elements of the clamp extend far beyond the longitudinal edge of the rods, its use is limited to conditions where there is sufficient space and where the mounting of additional elements, such as sensors or reflectors, is not required.

Thus, there is a need for a low profile clamp which provides a high friction condition, yet allows for full release when the hardware is loosened, which allows for movement in a vertical direction, as well as allowing for rotation and movement in a horizontal direction, and which provides minimum centerline offset to maintain the positioning of the rods.

SUMMARY OF THE INVENTION

The low profile rod clamp described herein is a highly functional, universal clamp. It is used to position two rods, most often in a perpendicular arrangement. The rods are positioned adjacent one another with their outer surfaces in contact to provide the highest possible load resistance. Its low profile design does not extend far beyond the rod edge while still providing for easy adjustment. The wrap around design provides a large amount of surface contact and increases friction. Finally, it is designed to be easily manufactured at a low cost.

In accordance with one embodiment of the present invention, there is provided a rod clamp comprising two halves, each half comprising a channel for receiving a support rod and a flat portion extending laterally from each side of the channel. Each flat portion has a hole therethrough for receiving a fastener. The hole is located proximate to each of the two ends of the channel, along a line which forms an acute angle to the longitudinal axis of the channel. Preferably, the fastener is a nut and bolt assembly, screw, or other fastening means. The clamp is preferably formed of steel, and in one embodiment, includes ridges formed on the inner surface of the channel to increase the friction between the clamp and the rod. In a preferred embodiment, the two halves of the clamp are identical.

In another embodiment of the invention, there is provided a guide rail support assembly comprising a pair of support rods and a rod clamp adapted to secure the rods in a perpendicular arrangement with contact between the outer surfaces of the rods. Preferably, the clamp comprises two halves, each half comprising a channel for receiving a support rod and a flat portion extending laterally from each side of the channel. Each flat portion has a hole therethrough for receiving a fastener. The hole is located proximate to each of the two ends of the channel, along a line which forms an acute angle to the longitudinal axis of the channel.

The rods and clamp are preferably formed of steel. The fastener is preferably a nut and bolt assembly, but screws and other fasteners can also be used. In one embodiment, the inner surface of the channel includes ridges to increase the friction between the rod and the clamp. Alternatively, one of the support rods can be welded to the channel in one of the halves of the clamp, to prevent movement. Preferably, the channels of the assembled clamp are arranged perpendicular to one another.

Yet another aspect of the invention includes a rod clamp comprising two halves, each half comprising a channel for receiving a support rod, and means for fastening the two halves together such the support rods are perpendicular to one another and in contact. In a preferred embodiment, the two halves of the clamp are identical.

Finally, there is disclosed a rod clamp comprising a channel for receiving a support rod, and a flat portion extending laterally from each side of the channel. Each of the flat portions has a hole therethrough for receiving a fastener, such that a hole is located proximate to each of the two ends of the channel along a line which forms an acute angle to the longitudinal axis of the channel.

DETAILED DESCRIPTION OF THE PREFERRED EMBODIMENT

The present invention can be incorporated into conveyor systems having various configurations. For simplicity of description and illustration, however, only the portions of the conveyor system most closely associated with the present invention are illustrated and described herein.

Figure 1:
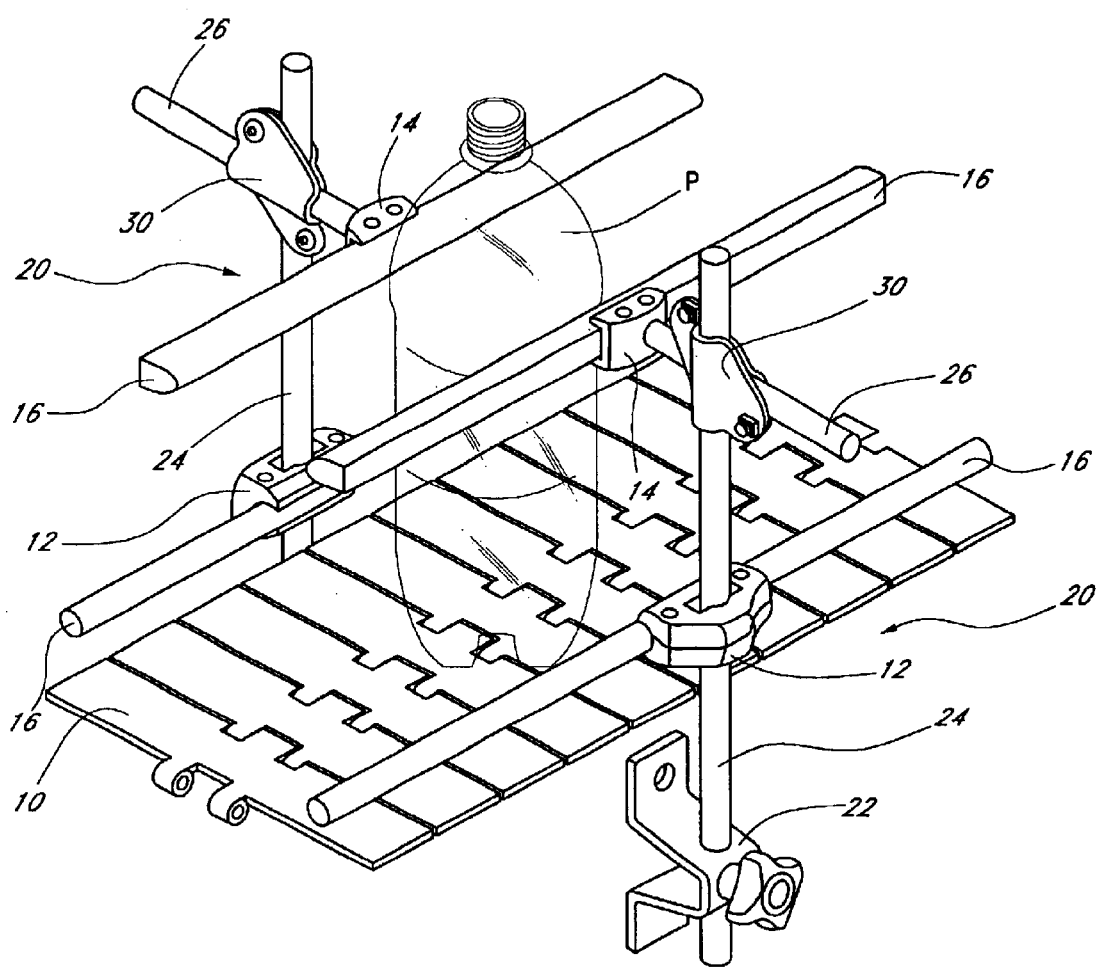
FIG. 1 is a perspective view of a portion of a conveyor system, illustrating low profile rod clamps in use.

Referring first to FIG. 1, a typical section of a simple conveyor system is illustrated. The system includes a conveyor belt or chain 10, which rides along the top of and is supported by two side frames (not shown). Guide rails 16 are positioned along either side of the conveyor chain 10, to maintain the desired direction of travel of the product P, and to prevent lateral movement of the product P off the chain 10. Guide rail support assemblies 20 are positioned on either side of the conveyor chain 10 to support and align the guide rails 16. A bracket 22 or similar fastener is mounted on the side frame (not shown) and a vertical support rod 24 attached. A horizontal support rod 26 is attached to the vertical support rod 24, and clamps or clips 12 are mounted on the support rods to position and support the guide rails 16. The support rods 24, 26 are preferably made of metal such as steel, although other materials including plastic can also be used.

Figure 2:
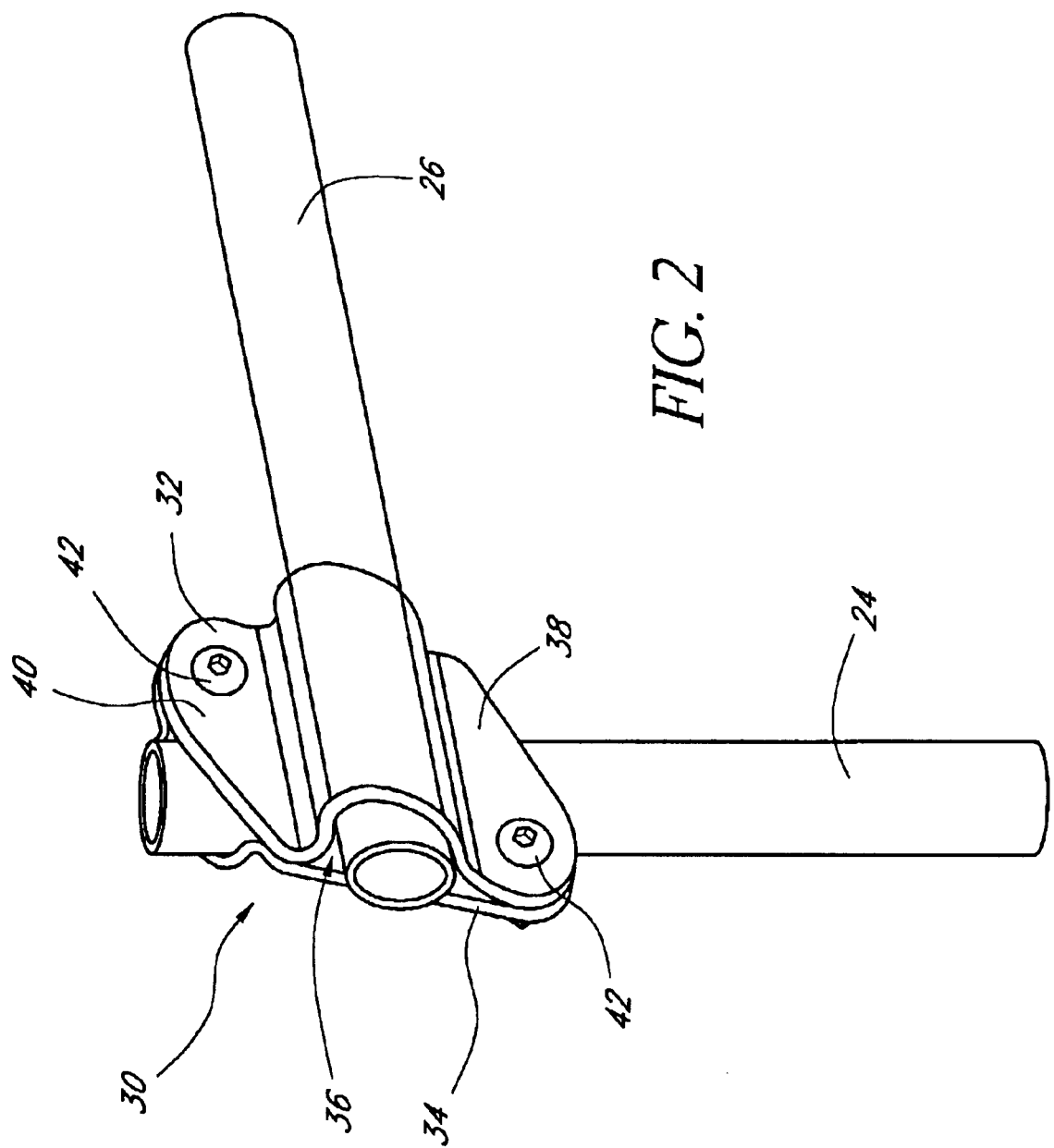
FIG. 2 is a perspective view of the low profile rod clamp, holding two circular rods in a perpendicular position.
Figure 3:
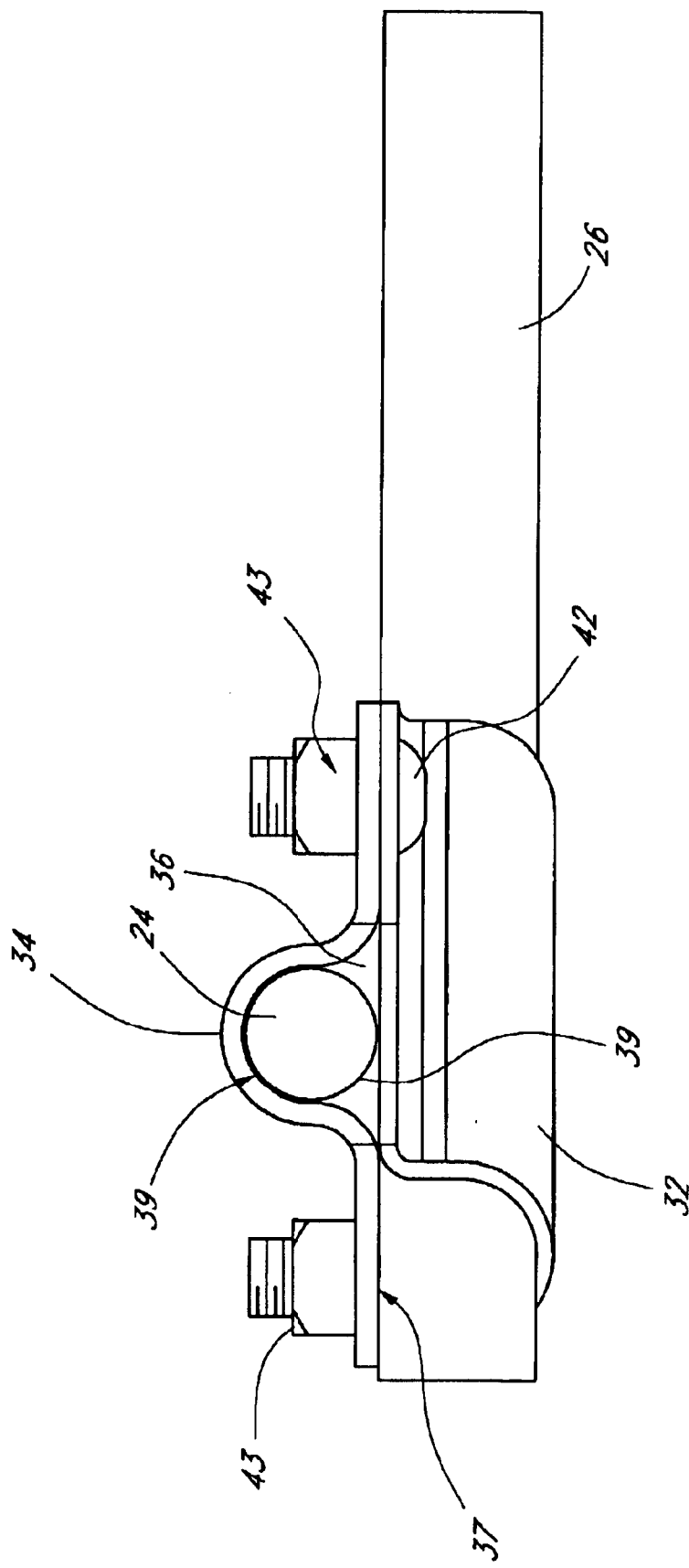
FIG. 3 is a top view of the low profile rod clamp of FIG. 2.
Figure 4:
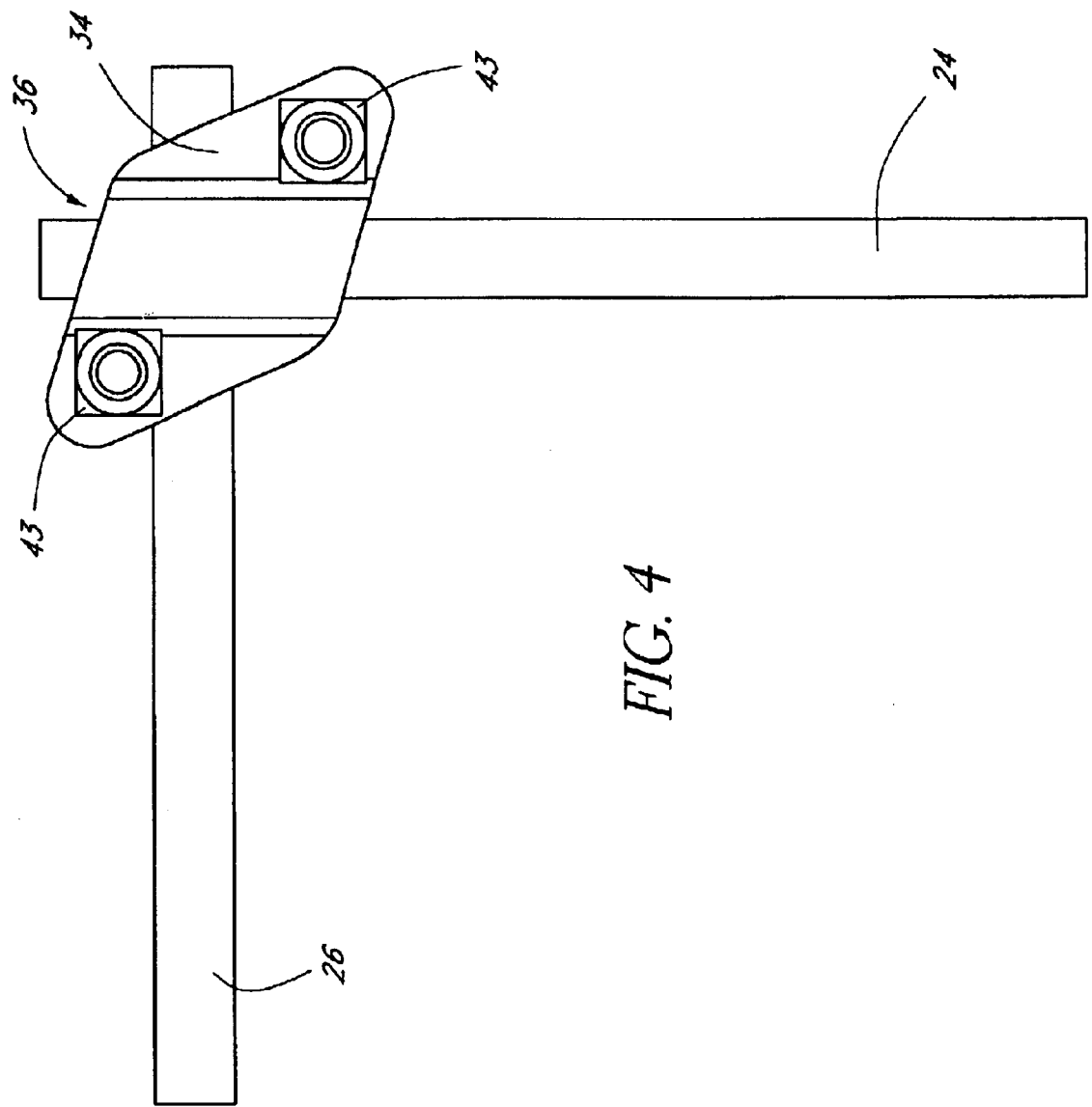
FIG. 4 is a side view of the low profile rod clamp of FIG. 2.
Figure 5:
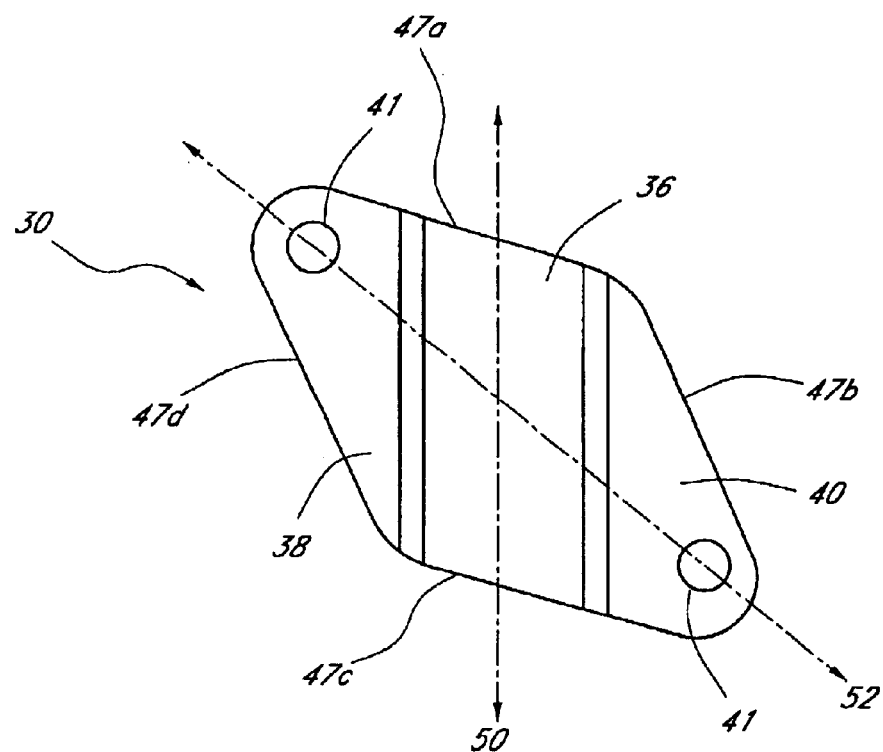
FIG. 5 is side view of one half of the low profile rod clamp.
Figure 6:
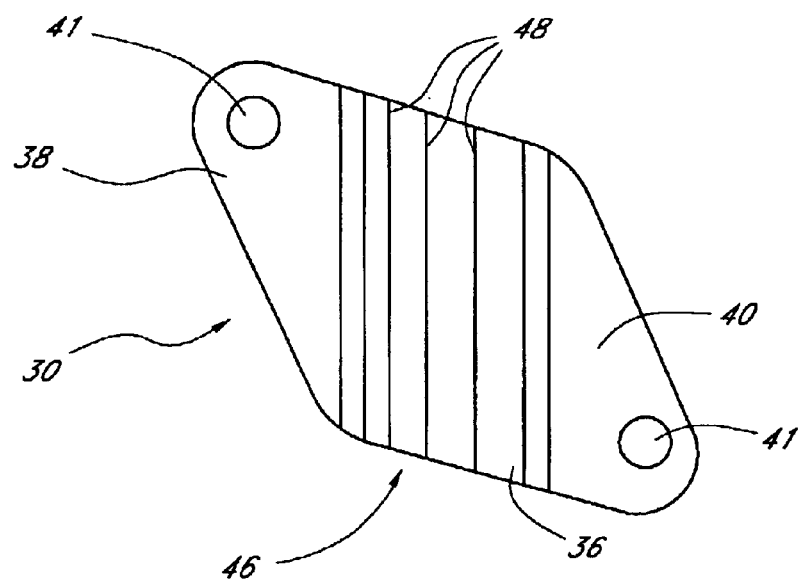
FIG. 6 is a side view showing the inside surface of one half of the low profile rod clamp.

A rod clamp 30 is used to connect the vertical and horizontal support rods 24, 26 together, as illustrated in FIGS. 2–4. Most often the rods 24, 26 are connected in a perpendicular arrangement. The clamp 30 is preferably formed of a metal, preferably steel, although other materials such as plastic can also be used. The clamp 30 comprises two halves 32, 34, each half having a semi-circular channel 36 designed to fit around a circular support rod 24, 26. When the two halves 32, 34 are fastened together, the rods 24, 26 are positioned perpendicular to one another, with a portion of the outer surface of each rod in contact. This wrap around design of the clamp 30 allows for a large amount of surface contact between the rods 24, 26, resulting in increased friction. Each half of the clamp 32, 34 includes two flat portions 38, 40 that extend laterally from either side of the channel 36, which are adapted to receive fastening means. As shown in FIGS. 5 and 6, each laterally extending portion 38, 40 includes a hole 41 sized to receive the fastening means.

As shown in FIG. 5, each half of clamp 30 is roughly in the shape of a parallelogram in which the adjacent sides are not perpendicular. The flat portions 38, 40 extend along the entire side on either side of the channel 36, and actually extend beyond the channel 36 on the end having a hole 41 therethrough. One hole 41 is positioned proximate each end of the channel 36. The holes 41 are positioned along a line 52 that is at an acute angle with a longitudinal axis 50 through the center of the channel 36. Thus, the line joining the holes is neither perpendicular to nor parallel to the longitudinal axis 50 through the center of the channel 36. Also, the straight portions of the sides of the clamp 47a, 47b, 47c, 47d are neither perpendicular to nor parallel the longitudinal axis 50 through the center of the channel 36.

In FIG. 3 it can be seen that the depth of the channel 36 is slightly less than the outer diameter of the rod 24. Thus, the outer surface of the flat portions 37 are positioned so that almost the entire rod 24 fits in the channel and the outer surface 39 of the rod 24 extends slightly beyond the plane formed by the outer surface 37 of the flat portion on the clamp. In other words, the distance from the channel axis to the plane defined by the outer surface 37 of the flat portions is slightly less than the outer radius of the rod 24. The length of the channel 36 will vary depending on the diameter of the rod 24, and should be of sufficient length to handle the loads involved.

The two halves of the rod clamp 32, 34 are held together by a bolt, screw, or similar fastening means. As illustrated in FIGS. 2–4, a pair of nut and bolt assemblies 42, 43 is used to tighten the two halves of the clamp 32, 34 onto the support rods 24, 26. As noted above, each laterally extending portion 38, 40 on each half of the clamp 32, 34 includes a hole sized to receive the bolt 42. When the two halves of the rod clamp 32, 34 are fastened together, the axes of the channels 36 are perpendicular to one another, although other arrangements are also possible if desired.

Once the rods 24, 26 are in the desired position and each rod 24, 26 is positioned within a channel 36 in the clamp 30, the bolts 42 are inserted through the hole in one half of the rod clamp 32, and then the corresponding hole in the other half of the clamp 34. The nuts 43 are rotated onto the bolts 42 on the opposite side from where the bolt 42 was inserted, and the bolts 42 are tightened, resulting in the two halves of the clamp 32, 34 and the outer surfaces of the rods 24, 26 coming together and being held firmly in place. As can be seen in FIGS. 3 and 4, the nuts 43 square on the outer raised surface of the channel 36, preventing them from rotating during installation of the bolts 42. This eliminates the need for a wrench during installation to hold the nuts 43 in place while the bolts 42 are tightened.

The clamp 30 maintains the positioning of the rods 24, 26, providing resistance against the loads resulting from the conveyor system. Should it be desired to adjust the position of the rods 24, 26, the bolts 42 are easily loosened and adjustments of the rods 24, 26 can be made. The clamp 30 maintains its shape, such that the bolts 42 can be loosened and tightened and the position of the rods 24, 26 adjusted repeatedly. The rod clamp 30 also provides the ability to raise or lower the rods 24, 26 in a vertical direction, while also allowing for rotation and the ability to move the rods 24, 26 in a horizontal direction as well.

The positioning of the two rods 24, 26 adjacent one another and with surface-to-surface contact results in increased friction when the rod clamp 30 is tightened around the rods 24, 26. This position also results in the highest possible load resistance. The adjacent positioning of the rods 24, 26 provides absolute minimum centerline offset, which requires larger loads to overcome the friction of the clamp 30.

Should additional friction be desired, ridges 48 (FIG. 6) can be made on the inside surface 46 of the rod clamp 30 where it contacts the rod 24, 26. These ridges 48 allow the contact surface of the clamp 30 to more firmly grip, or even dig into, the outer surface of the rod 24, 26. Alternatively, one half of the clamp 32 could be welded onto one of the rods 26, to prevent movement altogether.

The design of the rod clamp 30 allows the same part to be used for both the vertical 24 and horizontal 26 support rod, provided that the rods 24, 26 are of the same diameter. Its streamline design does not extend much beyond the rod edge, while still allowing for adjustments to be made easily.

The embodiments illustrated and described above are provided merely as examples of the low profile rod clamp constructed in accordance with the invention. Changes and modifications can be made from the embodiments presented herein by those skilled in the art without departure from the spirit and scope of the invention, as defined by the appended claims.

What is claimed is:

1. A conveyor system comprising:

a guide rail;

a first support rod having the guide rail mounted to a distal end thereof;

a second support rod being mounted to a conveyor structure;

a clamp comprising a first body having a channel with a longitudinal axis, the channel being configured to receive one of the rods, the first body having a shape of a parallelogram in which adjacent edges are not perpendicular;

the clamp further comprising a second body adapted to be clamped to the first body to rigidly support the first and second support rods against loads applied at the guide rail, the rods being supported by the clamp in a perpendicular orientation relative to one another;

wherein the first body has first, second, third, and fourth edges, wherein the first edge is parallel to the third edge, and the second edge is parallel to the fourth edge, and adjacent edges are not perpendicular to one another;

the channel of the first body having a first end, a second end, a first side, and a second side, the longitudinal axis of the channel being parallel to the first and second sides of the channel and extending between and forming an acute angle with the second edge and the fourth edge of the body;

said body having first and second flanges extending from the first and second sides of the channel;

wherein the first flange comprises a first hole proximate to the first end of the channel, and wherein the second flange comprises a second hole proximate to the second end of the channel, wherein a line between centers of the holes is non-parallel with lines defined by the first and third edges of the body.

2. The system of claim 1, wherein the first and second clamp halves are identical to one another.

3. The system of claim 1, wherein the first and second support rods comprise a substantially circular cross-section.

4. The system of claim 1, wherein the rods are in contact with one another at a clamp.

5. The system of claim 1, wherein the first rod is mounted in a horizontal orientation, and the second rod is mounted in a substantially vertical orientation.

6. The system of claim 1, wherein the channel of the first body has a height which is less than a diameter of a rod to be clamped therein.

7. A conveyor frame adapted to support and guide a conveyor element along a conveyor path;

a plurality of vertical support rods mounted to said conveyor frame along said conveyor path;

a plurality of horizontal support rods clamped with respect to said vertical support rods along said conveyor path, said horizontal support rods supporting said guide rails at a plurality of locations along said conveyor path;

a plurality of clamps clamping said horizontal support rods with respect to said vertical support rods, each of said damns comprising: a first body having a channel with a longitudinal axis, the channel surrounding a horizontal or vertical rod, the first body having a shave of a parallelogram in which adjacent edges are not perpendicular; the clamps further comprising a second body with a channel surrounding a rod damned with respect to the first body such that the support rods are sandwiched between the first and second bodies and are rigidly supported against loads applied at the guide rail;

wherein each of the clamp bodies has first, second, third, and fourth edges, wherein the first edge is parallel to the third edge, and the second edge is parallel to the fourth edge, and adjacent edges are not perpendicular to one another; the channel of each body having a first end, a second end, a first side, and a second side, the longitudinal axis of each channel being parallel to the first and second sides of that channel and extending between and forming an acute angle with the second edge and the fourth edge of the body; each body further comprising first and second flanges extending from the first and second sides of the channel; wherein the first flange comprises a first hole proximate to the first end of the channel, and wherein the second flange comprises a second hole proximate to the second end of the channel, wherein a line between centers of the holes is non-parallel with lines defined by the first and third edges of the body.

8. The system of claim 7, wherein the channel of each clamp body comprises a height which is less than a diameter of a rod to be clamped therein.

9. A method of assembling a conveyor structure in which a first support rod is held substantially perpendicular to a second support rod, the method comprising:

providing first and second clamp halves, each half comprising a channel having a longitudinal axis, the clamp halves further comprising flat portions extending laterally from each side of the channel, each of the flat portions having a hole therethrough, wherein a hole is located proximate to each of the two ends of the channel along a line which forms an acute angle to the longitudinal axis of the channel, each of the clamp bodies having first, second, third, and fourth edges, the first edge being parallel to the third edge, and the second edge being parallel to the fourth edge, and adjacent edges are not perpendicular to one another; the channel of each body having a first end, a second end, a first side, and a second side, the longitudinal axis of each channel being parallel to the first and second sides of that channel and extending between and forming an acute angle with the second edge and the fourth edge of the body; each body further comprising first and second flanges extending from the first and second sides of the channel; wherein the first flange comprises a first hole proximate to the first end of the channel, and wherein the second flange comprises a second hole proximate to the second end of the channel, wherein a line between centers of the holes is non-parallel with lines defined by the first and third edges of the body;

mounting a first support rod in a substantially vertical orientation relative to a conveyor structure;

placing the channel of the first clamp half around the first support rod;

placing a second support rod in the channel of the second clamp half;

orienting the second support rod to be perpendicular to the first support rod, and clamping the first and second clamp halves to one another such that the flat portions of the first clamp half engage the second support rod, and the flat portions of the second clamp half engage the first support rod such that the second support rod is rigidly held in a substantially horizontal plane.

* * * * *